United States Patent [19]
Cattani

[11] Patent Number: 5,549,019
[45] Date of Patent: Aug. 27, 1996

[54] APPARATUS FOR THE DYNAMICAL BALANCING OF A ROTATING BODY

[75] Inventor: Carlo Cattani, Bologna, Italy

[73] Assignee: Marposs S.p.A., Bentivoglio, Italy

[21] Appl. No.: 331,533

[22] PCT Filed: Jul. 22, 1993

[86] PCT No.: PCT/EP93/01945

§ 371 Date: Nov. 1, 1994

§ 102(e) Date: Nov. 1, 1994

[87] PCT Pub. No.: WO94/03788

PCT Pub. Date: Feb. 17, 1994

[30] Foreign Application Priority Data

Aug. 3, 1992 [IT] Italy ............... B092A0301

[51] Int. Cl.⁶ ........................................ F16F 15/22
[52] U.S. Cl. ................... 74/573 R; 74/572; 408/143; 409/141; 451/343
[58] Field of Search ............... 74/572, 573 R, 74/574; 51/59 SS, 169 X, 347; 409/141 X, 234; 408/143 X

[56] References Cited

U.S. PATENT DOCUMENTS

| | | | |
|---|---|---|---|
| 2,241,637 | 5/1941 | Ernst et al. | 74/573 R |
| 2,915,918 | 12/1959 | Comstock et al. | 74/573 R |
| 3,371,450 | 3/1968 | Board et al. | 51/169 |
| 3,698,263 | 10/1972 | Ito | 74/573 |
| 4,512,116 | 4/1985 | Vanderwal; et al. | 51/347 |
| 4,865,336 | 9/1989 | Keritsis | 409/234 |
| 4,951,526 | 8/1990 | Linder | 74/573 R |
| 5,074,723 | 12/1991 | Massa et al. | 409/141 X |
| 5,125,188 | 6/1992 | Ogawa et al | 51/169 X |
| 5,140,773 | 8/1992 | Miwa et al. | 51/59 SS |
| 5,240,358 | 8/1993 | Hackett et al. | 409/141 |
| 5,263,995 | 11/1993 | Mogilnicki et al. | 409/141 X |

FOREIGN PATENT DOCUMENTS

| | | | |
|---|---|---|---|
| 3743432 | 7/1988 | Germany | 74/573 |
| 4104350 | 8/1991 | Germany | 74/573 |
| 94/00789 | 9/1994 | WIPO | 74/573 R |

Primary Examiner—Vinh T. Luong
Attorney, Agent, or Firm—Dickstein, Shapiro & Morin, L.L.P.

[57] ABSTRACT

An apparatus for balancing the grinding wheel (2) of a grinding machine, comprising an assembly coupled to and rotating with the wheel and including masses (24, 26) the position of which is adjustable and electrical motors (28, 30) to control adjusting movements of the masses. The electrical connection between the motors and a survey and processing unit (16) including a power source (40) is provided by slip rings (48) and brushes (54). The brushes are fixed to a movable support (52). A spring (58) acts on the movable support to space the brushes apart from the slip rings. An actuator including, for example, electromagnets (60) acts on the movable support to perform the contact between the brushes and the corresponding slip rings.

6 Claims, 2 Drawing Sheets

APPARATUS FOR THE DYNAMICAL BALANCING OF A ROTATING BODY

TECHNICAL FIELD

The present invention refers to an apparatus for dynamically balancing a rotating body, with a supporting frame, an assembly fixed to and rotating with said body, comprising masses the position of which is adjustable, and at least one electrical motor connected to the masses and adapted to adjust said position, power supply and control means adapted to feed and control said at least one electrical motor, and spaced apart from the rotating body, and electrical connection means between the power supply and control means and said at least one electrical motor, with mutually slipping contacts comprising first contact elements and second contact elements that are connected to one and to the other of the rotating body and the supporting frame.

In particular, the invention refers to a balancing apparatus for dynamically balancing the grinding wheel of a grinding machine.

BACKGROUND ART

Unwanted vibrations are generally present in a grinding machine, and are denerated by out of balance conditions of the grinding wheel due to various possible reasons such as: shape and/or constitution defects (parallelism errors between the faces of the wheel, concentricity errors between the external abrading surface and the internal centering hole, inhomogeneity of the material, porosities, etc.), inaccurate assembling to the rotating spindle (causing the wheel center of gravity being spaced apart from the rotation axis), and, in general, deteriorations due to wear and/or splinter during the machining operations of the workpieces. The vibrations may cause inaccuracies in the machined workpieces such as roundness errors (ovality, lobing), and introduce loads and stresses that may damage the machine tool.

Known balancing apparatuses are coupled to the grinding wheel and comprise movable masses, that are driven by electrical motors, during the rotation of the wheel, along radial or angular paths, in order to compensate the out of balance.

The driving motors are part of the apparatus, rotate along with it and along with the wheel, and are fed by a fixed external power source, through an electrical coupling including, for example, slip rings and brushes.

The vibration caused by the out of balance is picked up by a sensor, and some parameters of the vibration (frequency, amplitude, and/or other ones) are valued, and then are displayed and/or processed in a unit that also comprises the above mentioned power source. The unit may then send proper "balancing" signals to the motors, in order to properly drive the movable masses.

A balancing apparatus comprising the above mentioned features is shown and described in patent U.S. Pat. No. 3698263. According to such patent, the driving motors are controlled by an operator on the basis of the vibration parameters that are displayed in an instrument.

A problem of the known apparatuses is represented by the wear of the brushes that remain in contact with the relevant slip rings in the course of the grinding wheel rotation, and by the consequent need of relatively frequent maintenance and replacement operations.

DE-A-4104350 discloses machine tools comprising a machining head carrying a tool, a piezoelectric transducer rotating with the tool, a control unit for generating electrical signals for driving the piezoelectic transducer, and an actuating device including slip rings and brushes for electrically connecting the piezoelectric transducer with the control unit.

The actuating device includes a pneumatic cylinder having an axially movable piston rod coupled to a brush holder. Springs may be interposed between the brushes and the brush holder for pushing the brushes onto the slip rings.

The machine tool can operate according to two machining modes, one of which is an ultrasonic mode in which the actuating device brings the brushes into contact with the slip rings and the tool is ultrasonically vibrated by the piezoelectic transducer.

The pneumatic cylinder may be replaced, in a manner not described, with an actuator such as a motor or a solenoid, as a means to move the brushes.

In the machine tools shown in the German patent application the brushes are urged both in contact with the slip rings and to a retracted position by means of the positive action of an unique actuating device, that, as a consequence, undergoes frequent operations and must include suitable driving and guiding mechanisms to drive in both senses the brush holder. Moreover, in case of a failure of the unique actuating device, the position of the brushes is not known for a certainty, and unproper working of the machine tool is possible.

DISCLOSURE OF INVENTION

Object of the present invention is to provide a balancing apparatus that overcomes the problems of the known apparatuses, and allows to improve the reliability, and to reduce the costs and the down time of the machine tool. This object is achieved, and other advantages are allowed, according to the present invention, by an apparatus in which the electrical connection means comprise a movable support, connected to one of said supporting frame and rotating assembly, and carrying said second contact elements, a retraction device for keeping the movable support in a first position, in which said first and second contact elements are mutually spaced apart, and an operative device for moving the movable support from said first position to a second position, in which said first and second contact elements touch each other for providing electrical connection between the power supply and control means and said at least one electrical motor.

BRIEF DESCRIPTION OF THE DRAWINGS

The invention is described hereinafter with reference to the annexed drawings, given as non limiting example only, wherein.

BEST MODE FOR CARRYING OUT THE INVENTION

Figure 1:
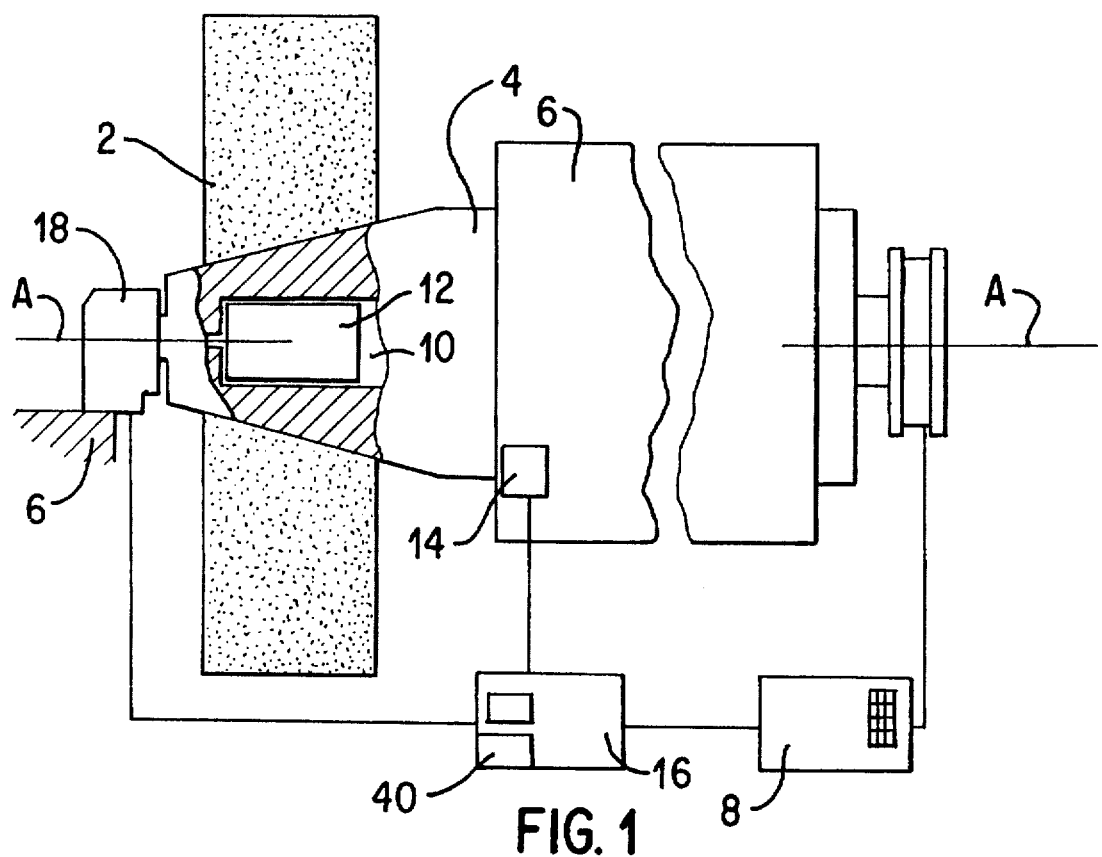
FIG. 1 is a schematic partially cutaway side view of an apparatus according to the present invention.

According to FIG. 1, a grinding wheel 2 of a grinding machine is connected to a rotating body, or spindle, 4 and rotates together with it about an axis A with reference to a relatively fixed supporting frame, or tool slide, 6, under the control of a control unit, or programmable logic controller, 8, and of other actuating means, not represented.

Figure 2:
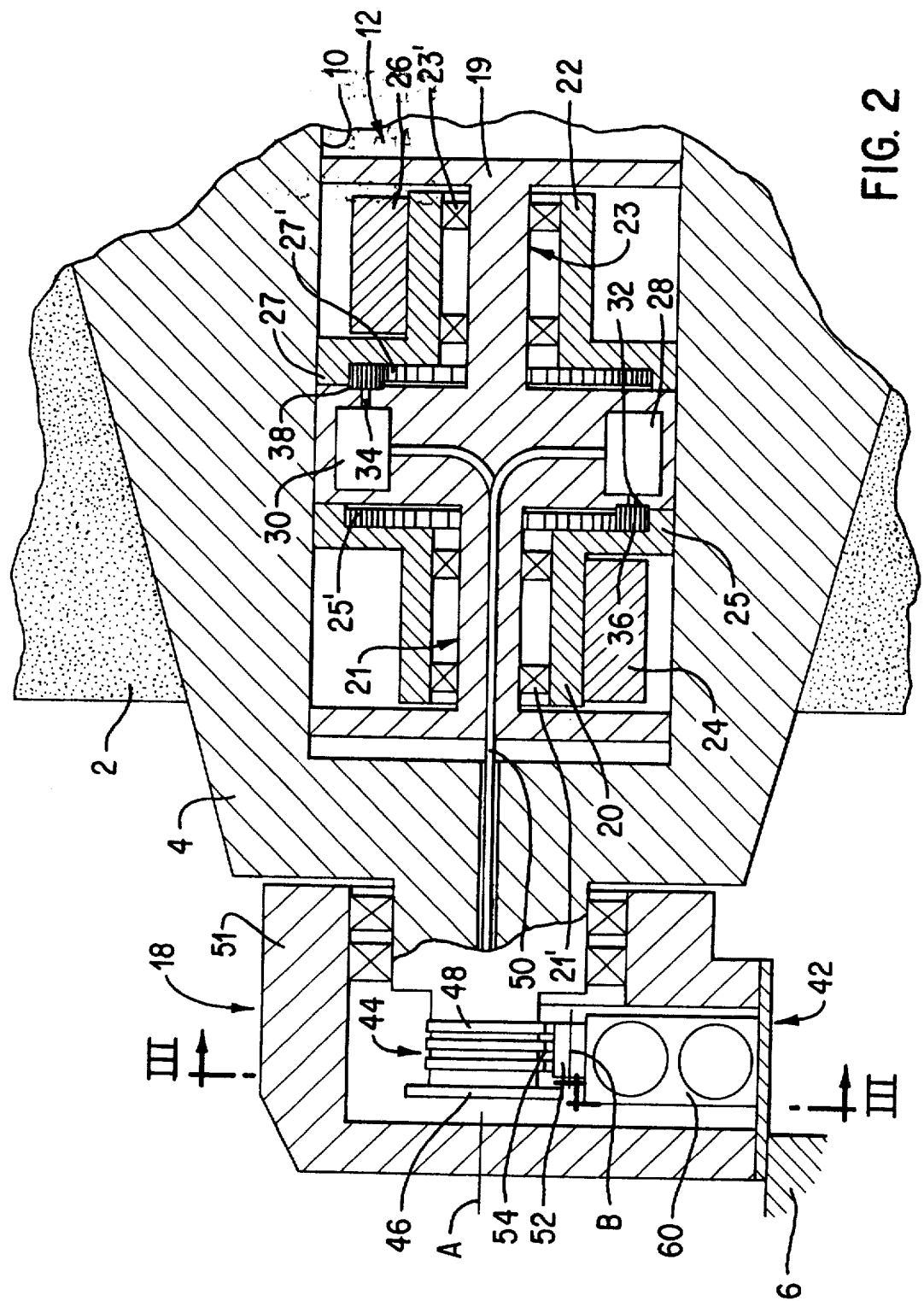
FIG. 2 is an enlarged cutaway side view, of a detail of the apparatus of FIG. 1.

A cavity 10 in the spindle 4 houses a balancing device 12, for the dynamic balancing of the wheel 2, and a vibration sensor 14 is fixed to the frame 6 of the grinding machine. Power supply and control means comprise a survey and processing unit 16 that is electrically connected to the vibration sensor 14, the latter sending to the former electrical signals responsive to the vibrations of the rotating parts (grinding wheel 2 and spindle 4). The survey and processing unit 16 is electrically connected, on its turn, to the programmable logic controller 8 and, through electrical connection means with a distribution terminal 18, to the balancing device 12, The device 12, that is better visible in FIG. 2, substantially comprises a framework 19, fixed, in a way not shown, to the spindle 4 (i.e. rotating with it), and defining two cylindrical surfaces 21, 23 aligned about axis A, and a rotating assembly with two tubular elements 20, 22, respectivelly coupled to the cylindrical surfaces 21, 23 by means of rolling bearings 21', 23', each tubular element 20, 22 carrying a compensation mass 24, 26, respectively, having the shape of a hollow half-cylinder. The tubular elements 20, 22 comprise also relevant circular flanges 25, 27 that define toothed inner surfaces 25', 27'. Two electrical motors 28, 30, with rotating stems 32, 34, are fixed to the framework 19 so that the stems 32, 34 lie parallel to the axis A and are coupled, by means of gears 36, 38 to the toothed surfaces 25', 27' of tubular elements 20, 22 to make them rotate about axis A. In such a way it is possible to adjust the angular position of masses 24, 26 with respect to the framework 19, in order to perform balancing operations in a way that is known per se.

Figure 3:
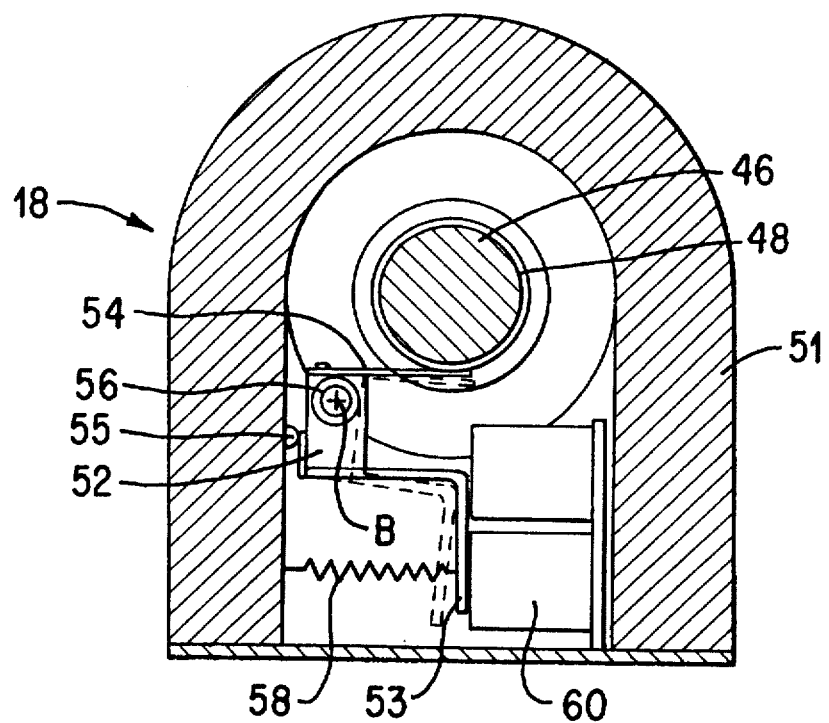
FIG. 3 is a cross-section, along line III—III, of a part of the apparatus of FIG. 2.

The distribution terminal 18—the main functional details of which are shown in FIG. 3—provides the electrical connection between the survey and processing unit 16 and the balancing device 12. Unit 16 comprises a power source 40.

The terminal 18 includes slipping contacts and substantially comprises two parts: a non-rotating part 42 fixed to the frame 6, and a rotating part 44 steadily connected to the spindle 4.

The rotating part 44 comprises a substantially cylindrical end 46 that carries first electrical contact elements, which include three slip rings 48, and are connected to motors 28, 30 by means of cables 50.

The non-rotating part 42 comprises a housing 51 and a movable support 52 that carries second electrical contact elements including three brushes 54 electrically connected to the unit 16, the brushes 54 and the slip rings 48 providing the electrical connection between the power source 40 and the motors 28, 30.

Fulcrum or pivoting means, schematically shown in FIG. 3 with reference 56, connects the movable support 52 to the housing 51 to define a rotation axis B, which is substantially parallel and offset with respect to axis A, and allows pivoting movements between the support 52 and the housing 51.

A retraction mechanism comprises a spring 58 arranged between the housing 51 and an extension plate 53 of the movable support 52 to pull the support 52 to a first position, defined by stop means 55, in which the brushes 54 are spaced apart from the rings 48, as shown with dashed lines in FIG. 3.

Operative means comprise an actuator with electromagnets 60, connected to and controlled by the survey and processing unit 16, adapted to attract the extension plate 53 and consequently move the support 52 to a second position (shown in FIG. 3 with continuous lines) in which the brushes 54 touch the rings 48 and electrically connect the unit 16 to the balancing device 12.

In the course of normal operation of the machine tool, and of the mutual rotation between parts 44 and 42, the brushes 54 retract under the action of spring 58, and do not slide on the corresponding rings 48. Whenever the performance of a balancing cycle is needed, the operative means 60 are energized, the brushes 54 are moved to contact the slip rings 48, and through the elecrical contact so provided in the terminal 18, the motors 28, 30 are properly controlled to drive the balancing masses 24, 26.

A balancing cycle is generally needed as a consequence of the replacement or of the dressing of the grinding wheel 2, and when the survey unit 16 picks up, through the sensor 14, values of the vibration parameters that exceed determined limits.

The balancing cycle ends when the values of the surveyed vibration parameters lie within a predetermined tolerance range: the time required for a fully automatic cycle does not generally extend beyond one or two minutes, whereas, in case that a partially manual operation is needed, a few minutes more are required.

From the above, it is apparent that the time in which the electrical connection between unit 16 and balancing device 12 is needed, is extremely reduced with reference to the overall working time of the machine tool (a very rough valuation of the ratio between the two above mentioned times might be of one to some hundreds).

The possibility of spacing the brushes 54 apart from the slip rings 48 allows to reduce the mutual slidings to the strictly necessary ones, and, as a consequence, to render the wear of the electrical contacts substantially negligible.

It is pointed out that the electromagnets 60 may be replaced with any different device that performs the same operation of properly moving the support 52 to the second position, providing the required electrical connection. Other different embodiments of an apparatus according to the present invention are possible, including differences with respect to what is shown in the drawings and above described. As an example, the balancing device may be connected externally to the grinding wheel spindle, in a per se known way.

I claim:

1. An apparatus for dynamically balancing a rotating body (2,4) that can rotate with respect to a supporting frame (6), comprising:
   - an assembly fixed to and rotating with said body (2,4), said assembly comprising:
     - masses (24,26) having a position with respect to said assembly, and
     - at least one electrical motor (28,30) connected to the masses (24,26) and adapted to adjust the position of said masses,
   - a power supply and control unit (16,40) adapted to feed and control said at least one electrical motor (28,30), and spaced apart from the rotating body, and
   - an electrical connection terminal (18, 42–60) between the power supply and control unit (16,40) and said at least one electrical motor (28,30), comprising:
     - a housing (51) connected to the supporting frame (6), mutually slipping first contact elements (48) and second contact elements (54) that are connected to one and to the other of the rotating body (4) and the housing (51), a support (52), connected to one of said housing (51) and rotating assembly, and carrying said second contact elements (54), a retraction mechanism (58) for keeping the support (52) in a first position, in which said first (48) and second (54) contact elements are mutually spaced apart, and an actuator (60) for moving the support (52) from said first position to a second position, in which said first (48) and second (54) contact elements touch each other for providing electrical connection between the power supply and control unit (16, 40) and said at least one electrical motor (28,30).

2. Apparatus according to claim 1, wherein the support (52) is rotatably coupled to the supporting frame (6).

3. Apparatus according to claim 2, wherein the retraction mechanism includes a spring (58) coupled to the housing (51) and the support (52).

4. Apparatus according to claim 3, wherein the actuator includes electromagnets (60) connected to said supply and control unit (16,40) and adapted to overcome the action of said spring (58).

5. Apparatus according to claim 4, wherein said rotating body includes a grinding wheel (2) of a grinding machine, said masses are two (24, 26), and said rotating assembly comprises a second electrical motor (30), and wherein said first contact elements include three slip rings (48) connected to said rotating body (2,4) and said second contact elements include three brushes (54) connected to the support (52).

6. An apparatus for dynamically balancing a grinding wheel (2) of a grinding machine, the grinding wheel being rotatably connected to a fixed supporting frame (6), the apparatus comprising:

a rotating body (4) integral with the grinding wheel (2), an assembly fixed to and rotating with said body (4), said assembly comprising:

masses (24, 26) having a position with respect to said assembly, and at least one electrical motor (28, 30) connected to the masses (24, 26) and adapted to adjust the position of said masses, a power supply and control unit (16, 40) adapted to feed and control said at least one electrical motor (28, 30) and spaced apart from the rotating body (4), and an electrical connection terminal (18, 42–60) between the power supply and control unit (16, 40) and said at least one electrical motor (28, 30);

wherein said electrical connection terminal (18, 42–60) comprises:

a rotating part (44) steadily connected to the rotating body (4), a non-rotating part (42) fixed to the frame (6), a support (52), pivotably coupled to the non-rotating part (42), mutually slipping first contact elements (48) and second contact elements (54) that are respectively connected to the rotating part (44) and to the support (52), a retraction mechanism (58) for keeping the support (52) in a first position, in which said first (48) and second (54) contact elements are mutually spaced apart, and an actuator (60) for moving the support (52) from said first position to a second position, in which said first (48) and second (54) contact elements touch each other for providing electrical connection between the power supply and control unit (16, 40) and said at least one electrical motor (28, 30).

* * * * *

UNITED STATES PATENT AND TRADEMARK OFFICE
CERTIFICATE OF CORRECTION

PATENT NO. : 5,549,019
DATED : August 27, 1996
INVENTOR(S) : Carlo Cattani

It is certified that error appears in the above-indentified patent and that said Letters Patent is hereby corrected as shown below:

Column 5, claim 2, line 14, delete "supporting frame (6)" to -- housing (51)--.

Signed and Sealed this

Seventeenth Day of December, 1996

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO.   : 5,549,019
DATED        : August 27, 1996
INVENTOR(S)  : Carlo Cattani It is certified that error appears in the above-identified patent and that said Letters Patent is hereby corrected as shown below:

Column 5, claim 2, line 14, change "supporting frame (6)" to --housing (51)--.

This certificate supersedes Certificate of Correction issued December 17, 1996.

Signed and Sealed this

Twenty-sixth Day of August, 1997

BRUCE LEHMAN

*Attest:*

*Attesting Officer*            *Commissioner of Patents and Trademarks*